United States Patent [19]
Cordy, Jr.

[11] Patent Number: 5,640,950
[45] Date of Patent: *Jun. 24, 1997

[54] SIMPLIFIED CRADLE AND DISH FOR A SOLAR POWERED HIGH-PRESSURE STEAM GENERATOR

[76] Inventor: Clifford B. Cordy, Jr., 5150 Mae Anne Ave. #213-126, Reno, Nev. 89523-1859

[*] Notice: The term of this patent shall not extend beyond the expiration date of Pat. No. 5,347,986.

[21] Appl. No.: 489,791

[22] Filed: Jun. 13, 1995

[51] Int. Cl.$^6$ .................................................. F24J 2/38
[52] U.S. Cl. .................. 126/577; 126/606; 126/690; 343/880; 343/882
[58] Field of Search .................. 126/573–582, 126/600–608, 688–691; 343/880, 882, 915

[56] References Cited

U.S. PATENT DOCUMENTS

| | | | |
|---|---|---|---|
| 509,393 | 11/1893 | Paine | 126/603 |
| 3,977,773 | 8/1976 | Hubbard | 126/607 |
| 4,030,890 | 6/1977 | Diggs | 126/573 |
| 4,031,385 | 6/1977 | Zerlaut et al. | 126/578 |
| 4,111,184 | 9/1978 | Fletcher et al. | 126/577 |
| 4,206,746 | 6/1980 | Chubb | 126/689 |
| 4,273,103 | 6/1981 | Uroshevich | 126/690 |
| 4,290,411 | 9/1981 | Russell | 126/574 |
| 4,320,288 | 3/1982 | Schlarlack | 126/574 |
| 4,333,446 | 6/1982 | Smyth | 126/574 |
| 4,340,031 | 7/1982 | Niedermeyer | 126/600 |
| 4,354,484 | 10/1982 | Malone et al. | 126/574 |
| 4,363,354 | 12/1982 | Strickland | 126/573 |
| 4,449,514 | 5/1984 | Selchk | 126/688 |
| 4,452,232 | 6/1984 | David | 126/574 |
| 4,484,198 | 11/1984 | Georgel | 343/880 |
| 4,558,551 | 12/1985 | Sevelinge | 343/880 |
| 4,821,705 | 4/1989 | Trihey | 126/574 |
| 5,347,986 | 9/1994 | Cordy | 126/574 |

FOREIGN PATENT DOCUMENTS

| | | | |
|---|---|---|---|
| 1179459 | 9/1985 | U.S.S.R. | 343/882 |

*Primary Examiner*—Carroll B. Dority

[57] ABSTRACT

A cradle and concentrator dish for solar powered high pressure steam generation is described. The cradle permits the dish to rotate around the declination axis to follow the sun through its seasonal motions. The cradle with the dish rotates around the polar axis to follow the sun through its daily motions. The cradle is formed from two tetrahedra. Both axes of rotation lie behind the reflective surface of the dish. The dish has declination axis bearings mounted well away from its rear surface on a separate structure designed to connect the dish to the bearings. The cradle and dish combination allow tubes carrying fluid to and from a receiver mounted over the dish to accommodate the rotation of the cradle and dish by elastic torsion of the tubes.

12 Claims, 4 Drawing Sheets

Fig. 2A
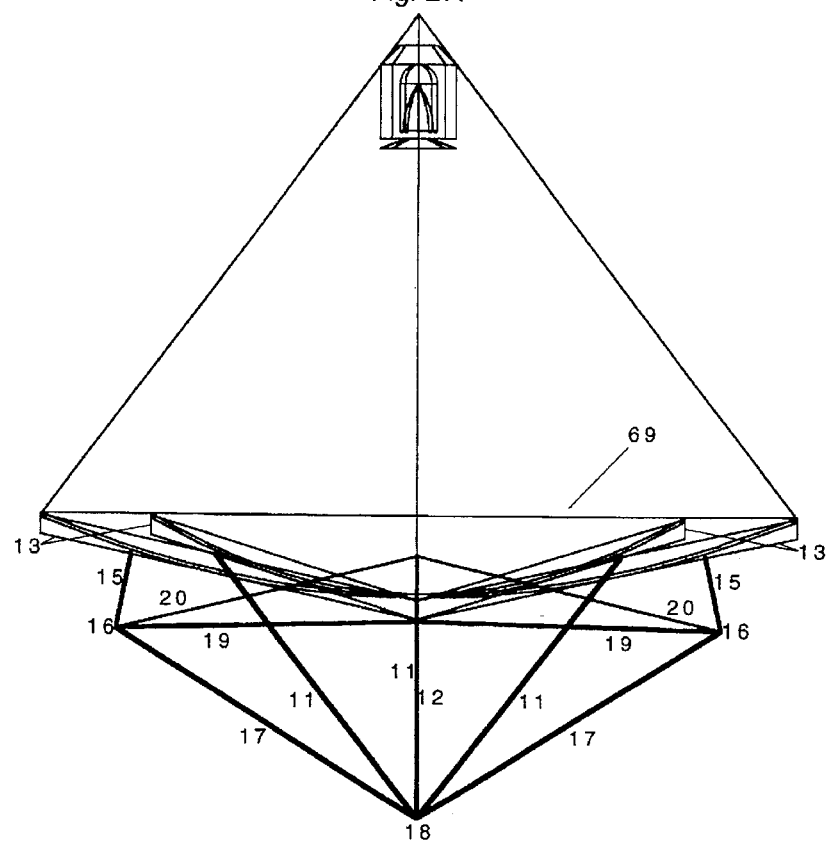
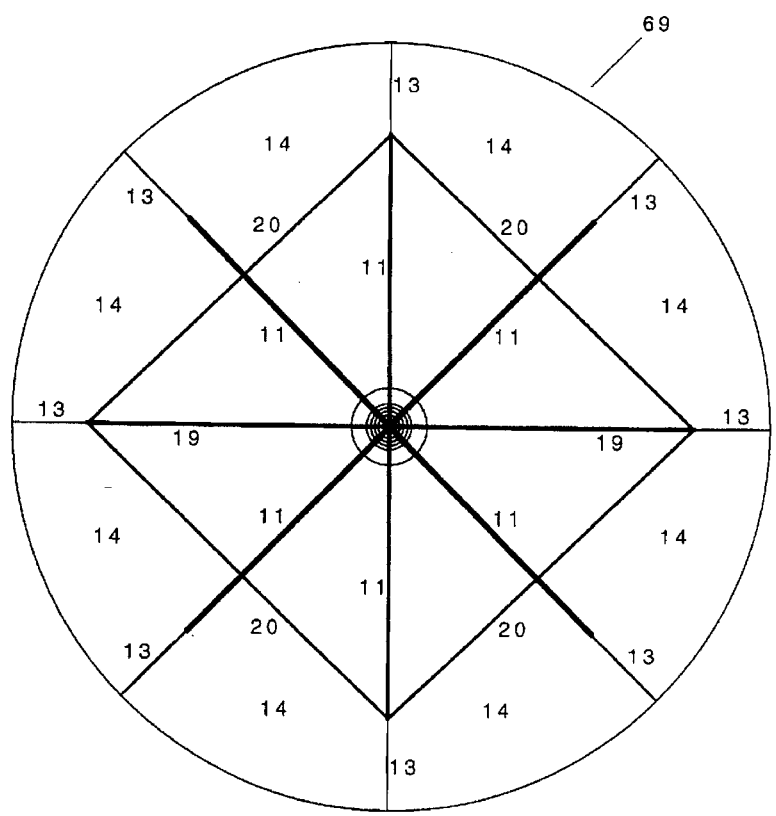
Fig. 2B

SIMPLIFIED CRADLE AND DISH FOR A SOLAR POWERED HIGH-PRESSURE STEAM GENERATOR

BACKGROUND OF THE INVENTION

This invention is in the field of steam generation using solar energy. A preferred embodiment of the present invention describes a point focus distributed receiver for generating high pressure steam.

Point focus distributed receivers for generating high pressure steam are known. One such receiver is described in Cordy, U.S. Pat. No. 5,347,986 ('986). The system described in the '986 patent has a concentrator dish for intercepting, concentrating, and focusing solar energy on a first focal area, the dish having a reflective front surface and bracing members extending behind the reflective surface of the dish, and a cradle forming a gimbal mount for the concentrator dish, the cradle and dish moving around a polar axis and permitting the concentrator dish and its bracing members to move around a declination axis within the cradle. The cradle delivers all forces acting upon it along its polar axis to the earth at the end of the cradle nearest the equator. The cradle is comprised of 12 members, one of which may comprise the concentrator dish and only one of which experiences flexural force.

Although the dish and cradle described in the '986 patent function well, both are complicated structures. Also, the dish only works if the declination axis lies close to the plane formed by the edge of the dish. In the field of solar energy, any reduction in complexity is desirable, as such reductions typically reduce the cost of the system. As cost is one of the limiting factors in solar energy generation, a simpler cradle and concentrator dish which still functions as well as the cradle and dish shown in the '986 patent are desirable.

SUMMARY OF THE INVENTION

A first preferred embodiment of the present invention comprises a cradle formed from two tetrahedrons and a concentrator dish whose axes of rotation are located behind the dish. The construction of both the concentrator dish and the cradle are simpler than known dishes and cradles, use less material and are less expensive. This first embodiment also permits simpler plumbing between the receiver mounted above the concentrator dish and the steam generator. This plumbing accommodates torsional forces along its length as the dish moves around the polar axis and flexural forces along its length as the dish moves around the declination axis.

The present invention will now be described in detail, with reference to the figures listed and described below.

BRIEF DESCRIPTION OF THE ILLUSTRATIONS

FIGS. 1A, 1B, 1C, and 1D are illustrations of the cradle which comprises part of the present invention;

FIGS. 2A and 2B are a cross section and top plan view of the concentrator dish which comprises part of the present invention;

DETAILED DESCRIPTION OF THE PREFERRED EMBODIMENTS

Figure 1A:
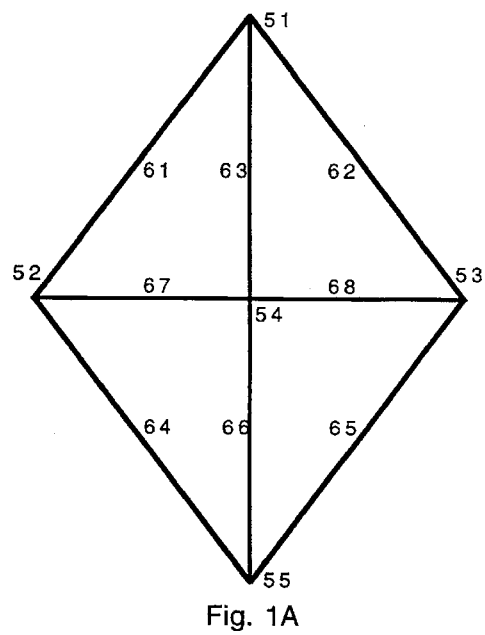
Figure 1D:
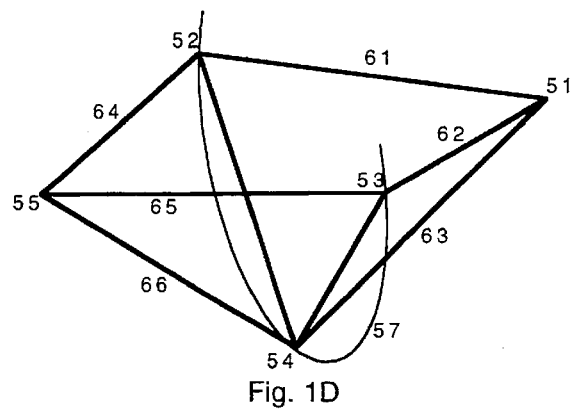
Figure 1C:
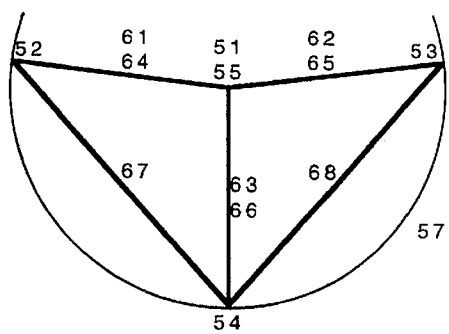
Figure 1B:
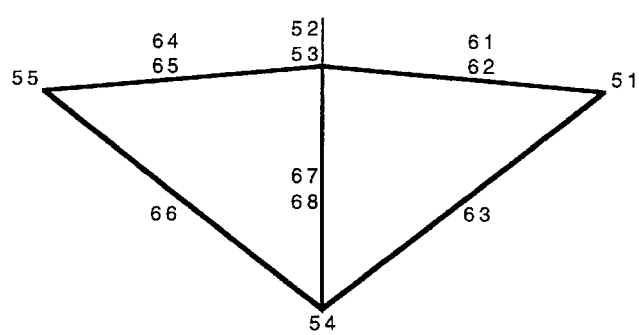

Recent measurements reported in "Wind Load Design Methods For Ground-based Heliostats and Parabolic Dish Collectors," Peterka, J. A., and Derickson, R. G., 1992, SAND92-7009, Sandia Corp. show that wind induced forces on a solar collector dish are nearly all along the axis of the dish. Herein, the axis of a solar collector dish is the axis about which a parabola is rotated to form the paraboloidal solar collector dish. Transverse forces on the dish are small. Therefore, there is no great advantage to keeping the axes of rotation of the dish close to the plane formed by the edge of the dish. Moving the axes of rotation behind the dish permits the construction of a simpler cradle for the dish. This simplified cradle, constructed from two tetrahedra, uses less material and is cheaper to build than known cradles. A new dish, also described herein, can be mounted in the simplified cradle and is somewhat less expensive than known concentrator dishes. The new cradle and dish allow for greater freedom in the routing of the tubes carrying water to the receiver and steam away from the receiver. The tubes do not need to be wound into a spring-like coil, such as taught by the '986 reference, to accommodate the motion of the dish. The unobstructed tube is long enough so that the rotation of the dish around the polar axis can be accommodated by torsion along the length of the tubes.

The Cradle

As shown in FIGS. 1A, 1B, 1C, and 1D the cradle taught herein is comprised of two tetrahedrons, the tetrahedrons respectively defined by nodes 51-52-53-54 and 52-53-54-55. In FIGS. 1B, 1C, 2A, 3A, and 3B, when two reference numbers appear to reference the same part, this indicates that the two parts would appear as one when viewed from the perspective of that particular figure. All members of the cradle experience only axial loads. The first tetrahedron is comprised of beams 61, 62, 63, 67, 68, and the concentrator dish. The second tetrahedron is comprised of beams 64, 65, 66, 67, 68, and the concentrator dish. In most applications, the distance from the declination axis, defined herein by nodes 52 and 53, to node 51 will equal the distance from the declination axis to node 55, but this is not a requirement.

The cradle's polar axis is defined herein by nodes 51 and 55. The cradle becomes lighter as the distance between nodes 52 and 53 is reduced. This distance can be reduced to less than the diameter of the concentrator dish. However, the right ascension drive track 57 must pass outside the declination axis bearings (see FIG. 2A and related description) and cannot interfere with the concentrator dish's rib braces. This places the minimum allowable distance from 52 to 53 at roughly 80% of the concentrator dish's diameter. The cradle also becomes lighter as the distance from node 51 to node 55 is reduced. It is desirable to have the cradle length somewhat longer than dish 69's diameter, but this is not absolutely necessary. For dishes with a focal ratio of roughly 0.6, a common value, the optimum position of the declination axis is between 0.3 and 0.4 dish radii behind the plane defined by the edge of the dish. The polar axis should be about 0.5 dish radii behind the plane defined by the edge of the dish. These values will prevent interference between the dish and the cradle.

The cradle described herein weighs approximately 60% less than the cradle described in the '986 patent. It has fewer component parts, which parts are also lighter and more easily handled. The use of thinner, lighter tubing in the cradle permits faster welding and assembly. This results in a cradle which is much less expensive than the cradle shown in the '986 patent.

The Concentrator Dish

The cradle described herein requires a dish whose declination axis is located behind its reflective surface. Such a dish is shown in FIGS. 2A and 2B. The dish 69's frame resembles a teepee, having frame members 11, center pole 12, and radial ribs 13 holding dish sections 14. First braces 15 extend from the declination axis bearing 16 to the ribs nearest the declination axis. Both first braces 15 attach to ribs 13 at an optimum distance of about 79% of dish 69's radius. This makes the rib and first braces associated with the declination axis considerably lighter and cheaper than in the '986 patent design.

The cradle/dish combination taught herein requires that the declination axis bearing 16 be mounted on a structure separated from the edge of the dish. In the design shown in the '986 reference, the small transverse forces across the dish were transmitted through the dish itself. In the present invention, these transverse forces cannot be transmitted through the dish. Second braces 17 extend from apex 18 of the teepee frame to declination axis bearing 16. Beams 19 extend from the declination axis bearing 16 to the central pole of teepee frame 12 and attach near the bottom of the dish. Beams 20 extend from the declination axis bearings 16 to the ribs 13 oriented perpendicular to the declination axis, where beams 20 attach near the bottom of ribs 13. Beams 20 are designed to prevent buckling of the dish under transverse loads. These work in tension and can be comprised of rods or cables. First braces 15 attach to the declination axis bearing and to the ribs nearest the declination axis.

Although the added structure near the declination axis makes it appear that the dish described herein will be heavier than the one shown in the '986 patent, savings in weight from the use of shorter braces going to the declination bearings and thinner ribs aligned with those bearings more than offset the weight of the declination axis structure. The cost of labor in the fabrication of the present invention's dish will be somewhat higher than that for the '986 patent.

Figure 3A:
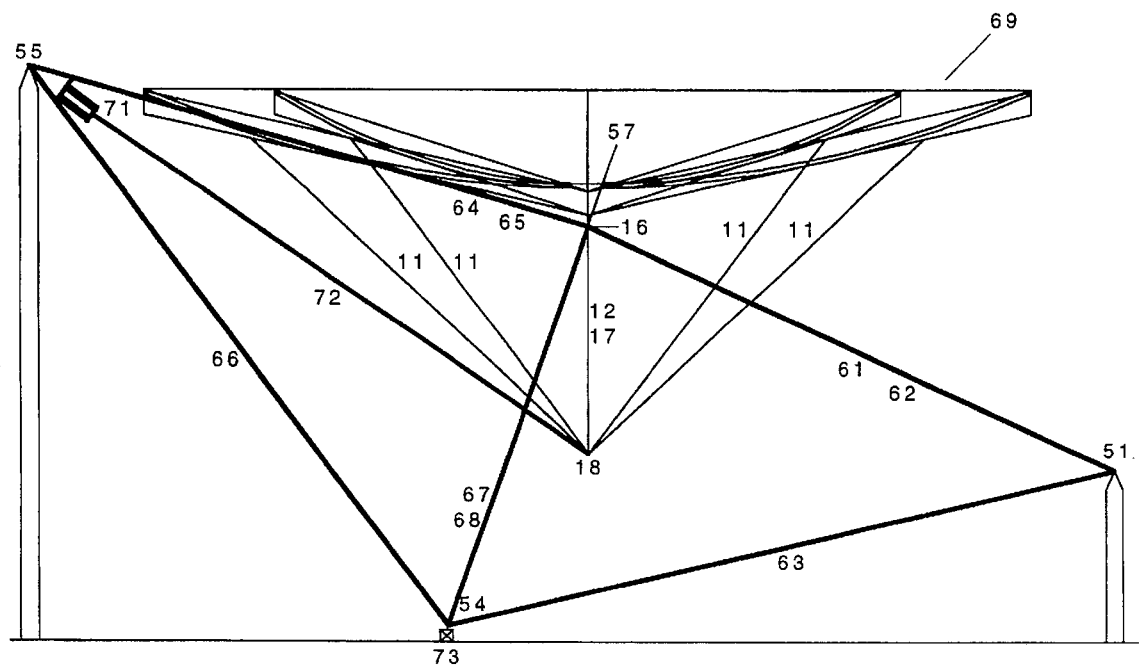
FIGS. 3A and 3B are respectively a side view and a front view of a mated cradle and dish, mounted on the ground.

The dish and cradle can be driven around the polar axis using a drive track 57 (FIG. 1C) similar to that described in the '986 patent. The dish can be driven around the declination axis within the cradle using a drive track similar to that described in the '986 patent. It is adequate and probably cheaper to use motor 71 and screw drive mechanism 72, connected between apex 18 of the teepee frame of dish 69 and a mounting site near node 55 of the cradle, as shown in FIG. 3A. Alternatively, a mounting site near node 51 could serve as an anchor point for the drive mechanism. A right ascension drive 73 could be mounted near the ground to drive the cradle around the polar axis.

Figure 3B:
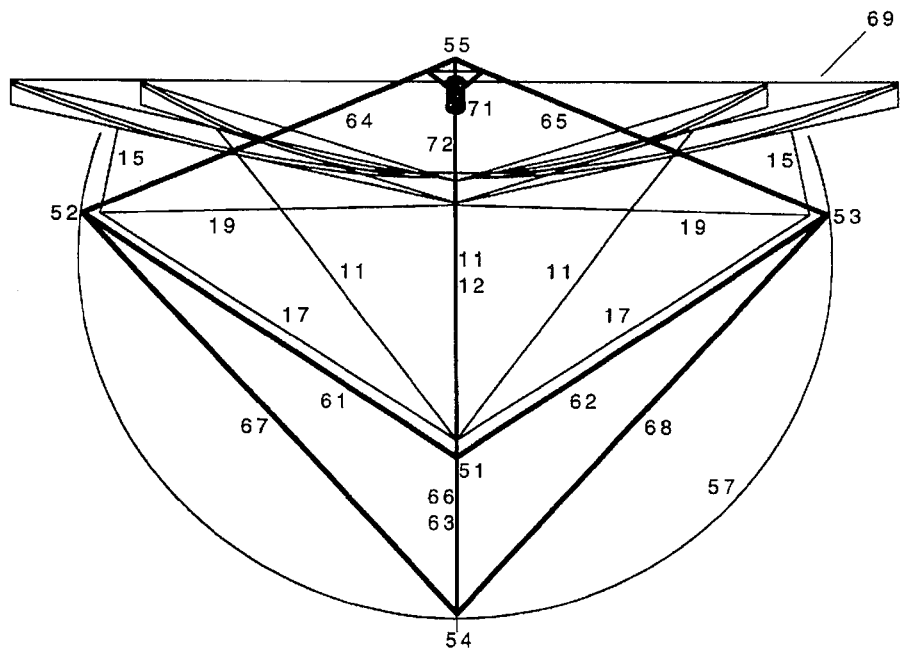

Both FIGS. 3A and 3B illustrate how dish 69 is mounted in the cradle and how the combination of the dish and cradle is fixed to the ground. Node 51 is affixed to a small concrete pad mounted directly on the ground, and node 55 can be attached to a concrete pylon as illustrated in FIG. 3A.

The Mount

The cradle taught herein can tolerate forces along the polar axis. It is not necessary to mount the polar end in such a way that these forces are eliminated. The polar end can be mounted on a tall pier, a monopod, a tripod, a guyed pole, or a more complex structure. No one type of mount is preferred.

At most latitudes, the equatorial end must be mounted well above the nominal ground level. All of the listed mounting structures are suitable. It is also possible to form the land on which the installation is built so that there is a small hill at the equatorial end of each cradle. Then the equatorial end of the cradle could be mounted on a simple concrete pad.

Plumbing

It is possible to carry water to the receiver and steam away from the receiver by elastically flexing the tubes, as described in the '986 patent. In the present invention, a simpler, less expensive method is available. Herein, the motion of the cradle around the polar axis can be accommodated by twisting the water and steam tubes. Motion around the declination axis is accommodated by flexing the tubes.

The well known equation for stress in a tube or rod twisted through an angle $\phi$ is:

$$\sigma = \phi E R / (2 L^* (1+\nu))$$

where $\sigma$ is the stress in the tube, $\nu$ is the Poisson ratio, L is the length of the tube, E is the modulus of elasticity, and R is the radius of the tube. For steel, $\nu$ is about 0.3, E is about 210 GPa, and the maximum allowable stress is about 350 MPa. Using these values, the minimum length over which a tube can be twisted elastically through an angle $\phi$ is:

$$L_{min} = 230 * \phi * R$$

At reasonable latitudes, the motion of the cradle around the polar axis will be no larger than ±1.9 radians (+110°). To accommodate this motion by elastic twisting of the tube, a tube length of 440 times the tube radius is needed. For reasonable head losses, the radius of the tube carrying steam should be about 0.001 times the dish radius. The tube carrying water can be much smaller. The cradle's rotation can be accommodated by twisting a tube length of 0.44 dish radii. To provide a reasonable safety margin, the twist should be distributed over several times that length of tube. The motion of the dish around the declination axis can be accommodated by flexing the tube elastically.

Figure 4:
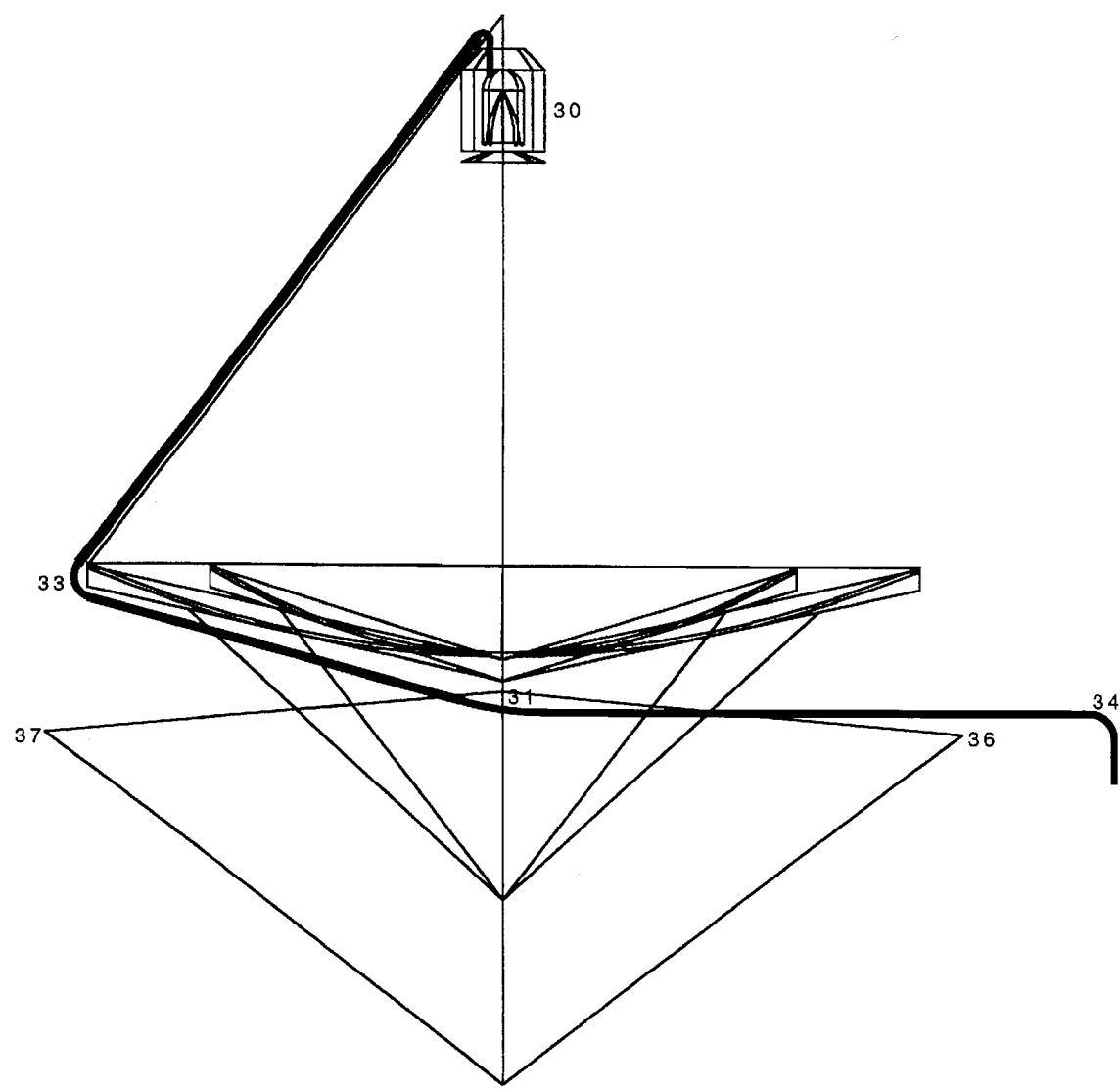
FIG. 4 is a side view of a portion of the completed system, showing the plumbing necessary to couple it to a steam engine or other thermal load.

One suitable routing of the tubes and their thermal insulation is shown in FIG. 4. The tubes are routed from receiver 30, around the edge of dish 69 nearest point 33, past declination axis, labeled here as 31, to a point 34, well beyond the equatorial end of the cradle. The declination axis flexure is distributed over a tube length of more than one dish radius in the vicinity of declination axis 31. The torsion from motion around the dish's polar axis (herein 36–37), is distributed over a length of about three dish radii between the end of the dish nearest point 33 and point 34, where the tubes connect to much larger distribution lines serving a whole row of dishes. The important feature is that the tubes accommodate the rotation of the cradle by elastic flexure in torsion. There are many paths the tubes could follow to implement this feature.

While the terms "water" and "steam" have been used in this description, the application is not limited to systems using that working fluid. The innovation will work equally well with other fluids.

What is claimed is:

1. A system for generating steam using solar energy comprising:

a concentrator dish for intercepting, concentrating, and focusing the solar energy in a first focal area, the dish having a reflective front surface and bracing members extending a predetermined distance behind the reflective surface of the dish, the concentrator dish rotating about a declination axis and a polar axis, both axes being located behind the concentrator dish;

a receiver mounted on the concentrator dish at the first focal area for receiving the solar energy focused by the concentrator dish and for transferring the solar energy to a working fluid;

a cradle forming a gimbal mount for mounting the concentrator dish and the receiver, the cradle being moveable around a polar axis and permitting the concentrator dish and its bracing members to move around both a polar axis and a declination axis within the cradle, the cradle comprising nine members, all members experiencing only axial loads;

a solar tracking system to maintain a solar image upon the receiver;

a computer controlled positioning system to maintain the dish's position in the absence of the solar image;

a first reversible drive system coupled to the cradle for driving the concentrator dish around the polar axis;

a second reversible drive system coupled to the concentrator dish for driving the concentrator dish around the declination axis; and a plumbing system mounted on the cradle and concentrator dish and coupled to the receiver and carrying cool working fluid to the receiver and heated working fluid from the receiver to the load.

2. A cradle for a solar concentrator dish, the cradle permitting the dish to move around a polar axis and a declination axis, the cradle comprised of nine members, the members having a first and a second end, the nine members forming a first and a second tetrahedron, each tetrahedron having six edges and four vertices, the first tetrahedron comprising the first, second, third, fourth, fifth, and sixth members and the first tetrahedron's vertices comprising:

a first vertex comprising the first ends of the first, second, and third members;

a second vertex comprising the second end of the first member, the first end of the fourth member, and the first end of the sixth member;

a third vertex comprising the second ends of the second and sixth members and the first end of the fifth member; and a fourth vertex comprising the second ends of the third, fourth, and fifth members; the second tetrahedron comprising the fourth, fifth, sixth, seventh, eighth, and ninth members and the second tetrahedron's vertices comprising:

a first vertex comprising the first ends of the seventh, eighth, and ninth members;

a second vertex comprised of the second end of the seventh member and the first ends of the fourth and sixth members;

a third vertex comprised of the second end of the sixth and eighth member and the first end of the fifth member; and a fourth vertex comprised of the second ends of the fourth, fifth, and ninth members.

3. The cradle of claim 2 wherein the second, third, and fourth vertices of the first tetrahedron and the second, third, and fourth vertices of the second tetrahedron are the same points in space and the fourth, fifth, and sixth edges of the first and second tetrahedrons are identical.

4. The cradle of claim 3 wherein the sixth edge of the first and second tetrahedrons comprises the declination axis of the cradle.

5. The cradle of claim 4 wherein a concentrator dish having a reflective front surface and a declination axis and bearing behind the reflective front surface is mounted on the cradle so that the declination bearing of the concentrator dish forms the sixth edge of the first and second tetrahedrons.

6. The system of claim 1 wherein the cradle and its nine members are assembled to form two tetrahedrons, each tetrahedron having six edges and four vertices, the first tetrahedron comprising the first, second, third, fourth, fifth, and sixth members and the first tetrahedron's vertices comprising:

a first vertex comprising the first ends of the first, second, and third members;

a second vertex comprising the second end of the first member, the first end of the fourth member, and the first end of the sixth member;

a third vertex comprising the second ends of the second and sixth members and the first end of the fifth member; and a fourth vertex comprising the second ends of the third, fourth, and fifth members; the second tetrahedron comprising the fourth, fifth, sixth, seventh, eighth, and ninth members and the second tetrahedron's vertices comprising:

a first vertex comprising the first ends of the seventh, eighth, and ninth members;

a second vertex comprised of the second end of the seventh member and the first ends of the fourth and sixth members;

a third vertex comprised of the second end of the sixth and eighth members and the first end of the fifth member; and a fourth vertex comprised of the second ends of the fourth, fifth, and ninth members.

7. The system of claim 6 wherein the second, third, and fourth vertices of the first tetrahedron and the second, third, and fourth vertices of the second tetrahedron are the same points in space and the fourth, fifth, and sixth edges of the first and second tetrahedrons are identical.

8. The system of claim 7 wherein the sixth edge of the first and second tetrahedrons comprises the declination axis of the cradle.

9. The system of claim 8 wherein the concentrator dish has a declination axis bearing located behind the dish, the declination axis and bearing forming the sixth edge of the first and second tetrahedron and permitting the dish to pivot about the declination axis.

10. The system of claim 1 wherein the plumbing system only experiences flexing when the dish rotates about the declination axis and experiences torsion when the dish rotates around the polar axis.

11. The cradle of claim 5 wherein a receiver is mounted on the concentrator dish at a first focal area for receiving solar energy focused by the concentrator dish and for transferring the solar energy to a working fluid and a plumbing system is mounted on the cradle and concentrator dish, coupled to the receiver, and carries the heated working fluid to a thermal load.

12. The cradle of claim 11 wherein the plumbing system only experiences flexing when the dish rotates about the declination axis and experiences torsion when the dish rotates around the polar axis.

\* \* \* \* \*